United States Patent [19]

Ryan

[11] Patent Number: 4,819,098
[45] Date of Patent: Apr. 4, 1989

[54] METHOD AND APPARATUS FOR CLUSTERING MODIFICATIONS MADE TO A VIDEO SIGNAL TO INHIBIT THE MAKING OF ACCEPTABLE VIDEOTAPE RECORDINGS

[75] Inventor: John O. Ryan, Cupertino, Calif.

[73] Assignee: Macrovision Corporation, Cupertino, Calif.

[21] Appl. No.: 38,163

[22] Filed: Apr. 14, 1987

Related U.S. Application Data

[63] Continuation-in-part of Ser. No. 935,055, Nov. 21, 1986, which is a continuation of Ser. No. 554,697, Nov. 23, 1983, abandoned.

[51] Int. Cl.⁴ .................. H04N 5/782; H04N 9/79
[52] U.S. Cl. ........................... 360/37.1; 358/335; 380/5
[58] Field of Search ............. 360/37.1, 60; 380/5, 380/15; 358/335

[56] References Cited

U.S. PATENT DOCUMENTS 4,163,253  7/1979  Morio et al. ............. 360/37.1 X
4,475,129 10/1984  Kagota ..................... 358/335 X Primary Examiner—Robert L. Richardson
Attorney, Agent, or Firm—Cushman, Darby & Cushman

[57] ABSTRACT

A video signal is modified so that a television monitor/receiver still produces a normal picture from the modified signal, whereas a videotape recording of this signal produces generally unacceptable pictures. Videotape recorders have an automatic gain control circuit which measures the sync pulse level in a video signal and develops a gain correction signal for keeping the video level applied to an FM modulator in the videotape recording system at a fixed, predetermined value. A plurality of positive pulses are added to the video signal with each immediately following a respective trailing edge of a normally occuring sync pulse. These added pulses are clustered at the vertical blanking interval of each field to minimize the affect of the same on the viewability of the picture defined by the signal while still causing the automatic level control circuit in a recorder to assess the video level at many times its actual value. The sync pulses themselves can also be at a reduced level, in order to enhance the effectiveness of the process.

13 Claims, 3 Drawing Sheets

METHOD AND APPARATUS FOR CLUSTERING MODIFICATIONS MADE TO A VIDEO SIGNAL TO INHIBIT THE MAKING OF ACCEPTABLE VIDEOTAPE RECORDINGS

CROSS-REFERENCE TO RELATED APPLICATION

This application is a continuation-in-part of U.S. patent application Ser. No. 935,055 filed Nov. 21, 1986 for METHOD AND APPARATUS FOR PROCESSING A VIDEO SIGNAL SO AS TO PROHIBIT THE MAKING OF ACCEPTABLE VIDEO TAPE RECORDINGS which, in turn, is a continuation of U.S. patent application Ser. No. 554,697 filed Nov. 23, 1983 and now abandoned having the same title.

BACKGROUND OF THE INVENTION

This invention relates to a method and apparatus for modifying a video signal so that a videotape recording of a video signal produces generally unacceptable pictures while a television monitor/receiver produces a generally normal picture from the modified signal.

There exists a need for a method and system for modifying a video signal so that the signal produces a normal color picture on a television receiver, but videotape recording of the video signal is inhibited or prevented.

Some of the early work resulted in methods which are not satisfactory. For example, U.S. Pat. No. 4,163,253 was issued to Morio et al. in July of 1979. This patent describes an arrangement in which a positive pulse is added to the back porch portion of each horizontal blanking interval. This approach results in significant playability problems. In this connection, video cassette recorders designed for the consumer market place invariably feature some form of automatic gain control circuitry (AGC). The AGC circuit insures that the video level applied to the FM modulator in the recording system remains at a fixed, predetermined value, even if the video level applied to the machine's input terminal varies widely about the nominal value. Without an AGC system, high level signals would be distorted and clipped and low level signals would be marred by the noise and interference products generated by the recording process. If the input level dropped to less than ⅓ of normal value, the replayed signal might not even be strong enough to reliably sychronize the receiver's timebases, hence giving rise to noisy unstable pictures. This early system, however, did not take into consideration the fact that many television monitor/receivers use the back portion region of a video signal for black-level clamping. The result is that while the approach described in the Morio et al. patent of confusing the AGC of a video cassette recorder does result in a copied tape being generally unviewable, the video signal also does not provide viewable pictures on many television monitor/receivers when it is used directly. This makes the process useless in practice.

The instant inventor is responsible for more recent and more successful approaches to preventing the unauthorized recording of a video signal. Two of such approaches are described in U.S. Pat. Nos. 4,577,216 and 4,631,603. The approach described and claimed in U.S. Pat. No. 4,631,603 and the approach described and claimed in continuing copending U.S. patent application Ser. No. 935,055 are similar to the Morio et al. arrangement, in that they rely on confusing the AGC of a video cassette recorder. They differ from the Morio et al. arrangement, however, in a major aspect. That is, they rely on differences between a video cassette recorder and a television receiver to assure that while the modifications made to a video signal prevent copying by a video cassette recorder, they do not significantly affect the playability of such signal on a conventional television monitor/receiver.

SUMMARY OF THE INVENTION

A different approach has been discovered for modifying a composite video signal to confuse the AGC of a video cassette recorder as described above, while not material affecting the playability of the resulting signal. That is, it has been found that by "clustering" during a field the modifications to a composite video signal responsible for confusing the AGC circuitry of a video cassette recorder, the effect of such modification on the playability of the video signal on a television receiver/monitor is significantly attenuated. Most desirably, the modifications of the signal take place during that portion thereof which is responsible for vertical blanking, i.e., the return of a beam sweep from the end of a raster scan field to the beginning. The video signal does not provide during such time a viewable portion of a video picture, with the result that any effect of the modifications to the video signal on the circuitry of a television receiver/monitor will not occur during a viewing interval. Thus, from the practical standpoint and deleterious affect on playability is virtually eliminated.

It therefore is an object of this invention to provide a method and apparatus for modifying a video signal so that a conventional television monitor/receiver produces a normal picture from the modified signal, whereas a videotape recording made from the modified signal is rendered unacceptable.

It is a particular object of this invention to provide such a method and apparatus in which the voltage amplitudes of a portion of the back porch intervals following the trailing edges of a substantial number of sync pulses in a cluster of the same are significantly raised. This is achieved most simply by adding pulses to the video signals at the back porch intervals, which pulses raise the voltage amplitude to the peak white level of the signal.

It is a more specific object of the invention to cluster the modifications to the video signal at the portion of the signal responsible for vertical blanking in a conventional television monitor/receiver. The result of this particular location of the clustering is that any deleterious effect of the modification on the direct viewability of the modification is essentially "masked" and not visable.

Other objects and advantages of the present invention will appear from the detailed description taken in conjunction with the accompanying drawings.

BRIEF DESCRIPTION OF THE DRAWINGS

With reference to the accompanying drawings.

DETAILED DESCRIPTION OF THE PREFERRED EMBODIMENTS

It is known that by modifying certain characteristics of a video signal, the automatic gain control circuits in a videotape recorder can be forced to behave as if the video signal was much larger than it actually is. The result is that when the signal is recorded on tape, the recording is at such a low level that on replay a television monitor/receiver produces noisy unstable pictures. It has been discovered that by clustering the modifications to occur only during a limited portion of the video signal responsible for the production of a frame during scanning, the effect of the modifications on the black-level control circuitry of a television monitor/receiver is minimized. If the modifications are clustered during those portions of a video signal responsible for vertical blanking during scanning, from a viewer's standpoint the affect is virtually eliminated.

Figure 1:
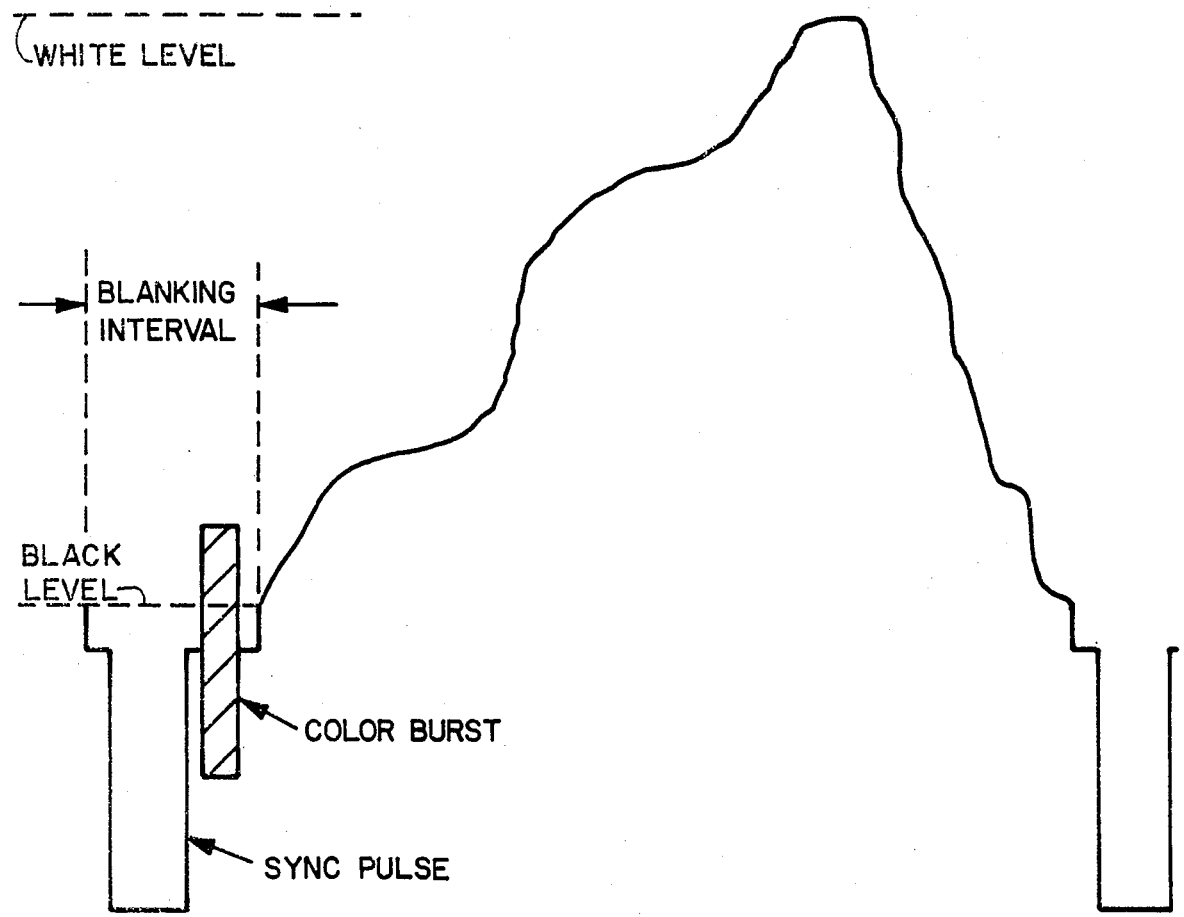
FIG. 1 is an illustration of that portion of the waveform of a typical color video signal responsible for one horizontal trace and return.

Turning now to FIG. 1, the waveform of that portion of a typical color video signal responsible for one horizontal scan trace and return is illustrated. The only features of this waveform portion which remain constant despite changes in picture content are those which occur during the blanking intervals, notably the sync pulses and color burst. Because the level of the color burst is highly dependent upon tuner response, the level of the sync pulses (any of the pulses which go from blanking level to a sync tip level, including equalizing pulses and vertical sync pulses) are almost always used as the reference level in automatic gain control systems of videotape recorders. Sync pulses are also almost always used as a reference level in the black-level control systems of television monitors/receivers, as well.

Figure 2:
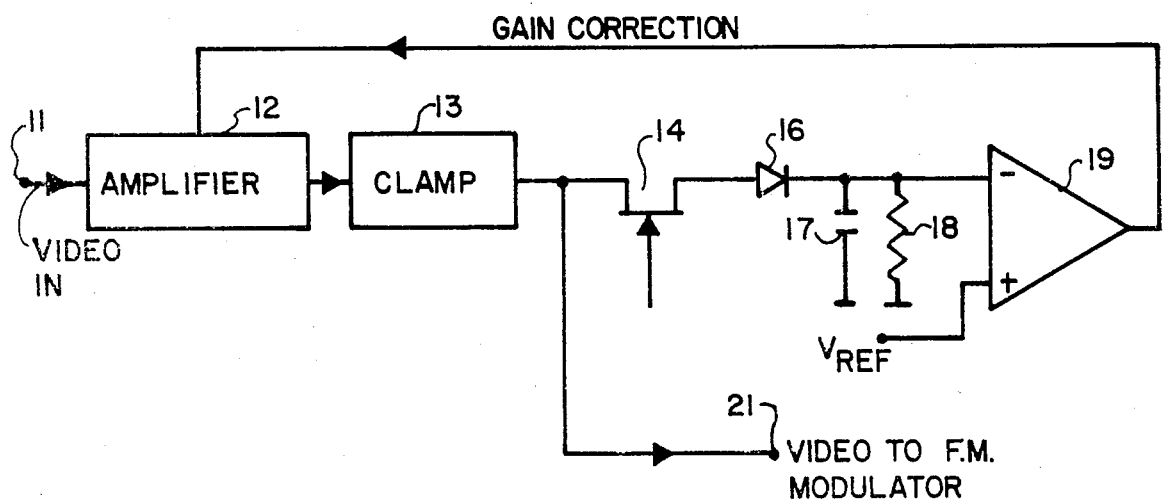
FIG. 2 is a block diagram of a typical automatic gain control circuit of a videotape recorder.

Referring now to FIG. 2, a typical automatic gain or level control system as utilized in videotape recorders is illustrated. In the typical system illustrated in FIG. 2, a Video In signal at a terminal 11 passes through an amplifier 12 and to a sync-tip clamp or DC restorer circuit 13, which establishes the sync tip voltage at some value $V_1$. A sampling circuit consisting of a transistor switch 14 and a positive peak detector, including diode 16, capacitor 17, and resistor 18, measures the voltage of the video signal just after the trailing edge of the sync pulse to yield a voltage $V_2$. The difference voltage $(V_2-V_1)$ is a measure of the sync pulse level. A differential amplifier 19 compares this sync pulse voltage with a reference voltage $V_{ref}$, and generates at its output an error or gain correction signal which is coupled back to the amplifier 12. This negative feedback arrangement insures that the signal level of the video signal applied to an FM modulator input at terminal 11 remains constant at the signal level value chosen by the designer of the circuit.

Figure 3:
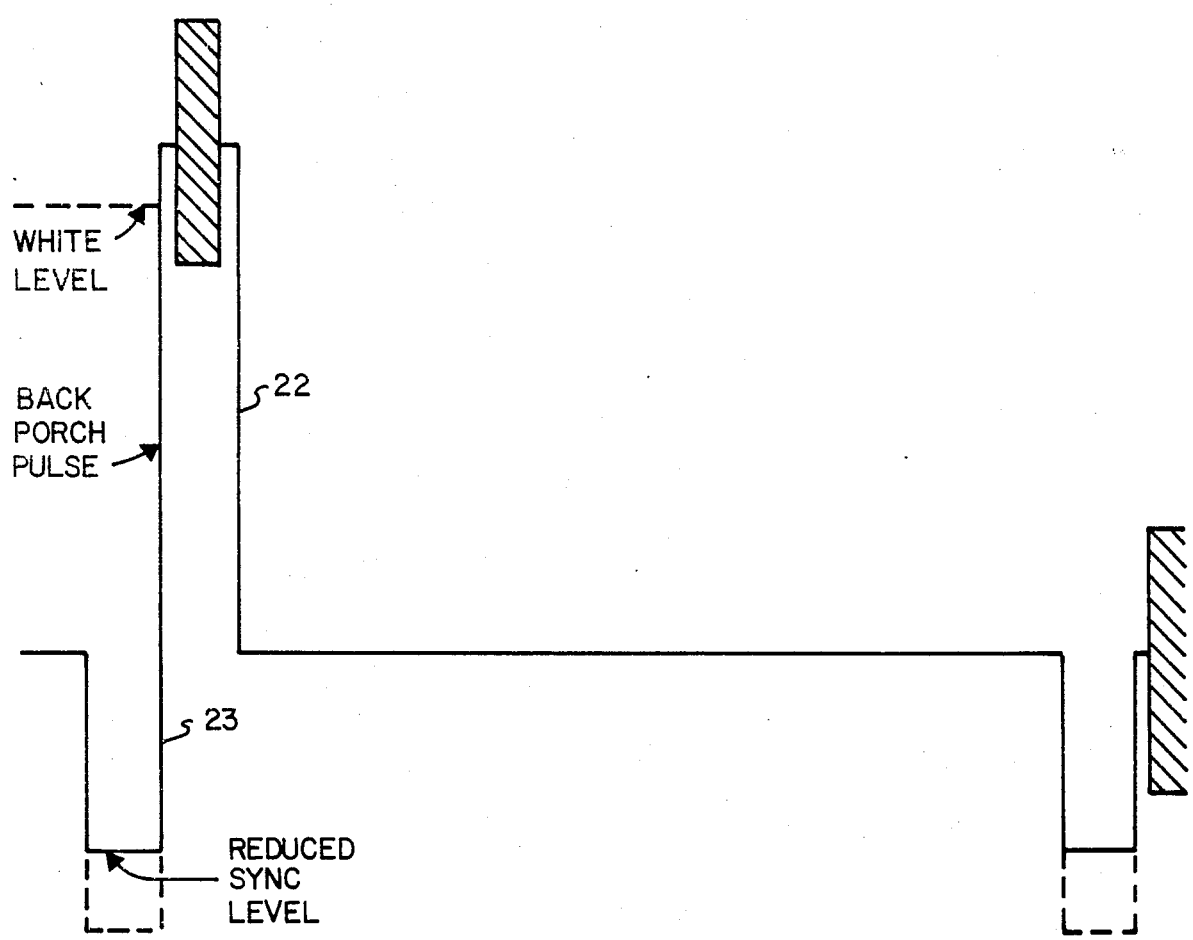
FIG. 3 illustrates a portion of a composite video signal waveform during a vertical blanking interval, as modified in accordance with the invention.

Turning now to a consideration of FIG. 3, there is illustrated a portion of a waveform of a video signal modified in accordance with one embodiment of the present invention. The waveform portion illustrated in FIG. 3 is a portion of a video signal during vertical blanking. Referring to FIG. 3, it can be seen that a positive pulse 22 has been added to the video signal immediately following the trailing edge of a sync pulse 23. For maximum affect, the amplitude of this pulse should be such as to raise the back porch voltage to the level of peak white or greater as shown in FIG. 3. This positive pulse causes the automatic gain control circuit in a videotape recorder to assess the sync pulse level at about 3½ times its actual value. The feedback action of the automatic gain control circuit as discussed in connection with FIG. 2 will then reduce the signal at the FM modulator input to about 30% of the correct value in the ideal case. The replayed signal as recorded on the videotape recorder will, therefore, be well below normal level and have a poor signal/noise ratio. In many cases the signal will not be strong enough on replay to properly synchronize a television monitor/receivers' scanning circuits.

In many television monitors and receivers the black level is stabilized by clamping the back porch of the video signal to a reference voltage. If all or a significant number of the horizontal scan lines of the picture were modified as shown in FIG. 3, the effect of the modification to the video signal on the direct viewability of the picture produced on a monitor/receiver would be serious and intolerable. That is, the black level of the picture would be significantly depressed. This would require the brightness control of the television receiver to be turned up by an amount which might be beyond the receiver's capabilities. In accordance with the teachings of the present invention, this problem is virtually eliminated.

The back porch pulse illustrated in FIG. 3 is added only in portions of the video signal responsible for a scan frame which are "clustered" relative to the frame. It has been found that such clustering of the modification results in the desired prevention of recording while not materially interfering with the viewability of a picture formed from the video signal so modified.

For best results, the clustering should be at the vertical blanking intervals of a field. This causes any effect on the video signal to occur in a region of the signal which is not normally responsible for the viewed display of a picture. Since the automatic gain control systems of videotape recorders use peak detectors with decay times of many field periods, these clustered added positive back porch pulses will still have the desired affect on the video level and lead to unacceptable video tape recordings. It has been found that at least twenty and up to thirty pulses should be added to each field, although in some instance less can be used. These pulses are added after every sync pulse occuring during the vertical blanking that is normally associated with horizontal scanning. This is approximately 11% of all of such type of sync pulses.

It should be noted that the location of the clustering is quite important, particularly with respect to the number of pulses which can be added without affecting viewability. If the cluster is located within a portion of the video signal responsible for actual picture display, a cluster which is approximately 5% of a field will not cause significant viewability problems with most monitors/receivers while yet preventing good copying. A cluster which is 15% of a field and located in a portion of the video signal responsible for a viewable picture will be effective to prevent copying, but many television monitors/receivers will show a slight darkening of the picture at the location of such cluster. The location of the cluster at the vertical blanking interval removes these limitations by enabling insertion of the pulses at a portion of the signal which is not responsible for viewing. In this connection, television monitors/receivers generally are overscanned by approximately 10% per field. This means that there are approximately 24 horizontal scan lines at the vertical blanking interval which do not form a portion of a picture element that is displayed. Twelve of these lines are at the beginning of the vertical blanking interval, whereas 12 are at the end. A cluster of pulses can include the pulses on some or all of such lines without resulting in problems in viewing which are noticable to a typical viewer. However, some slight darkening of the viewable picture at the top of that portion of a display which can be viewed may occur.

As a practical matter at least about 25% (preferably substantially more) of those pulses occurring during a cluster should be modified in accordance with the invention.

Some videotape recorders have automatic gain control systems which really do not have sufficient feedback control range to reduce a video signal to the extent discussed above. Therefore, if desired, as an additional feature of this embodiment of the present method and apparatus, the level of the sync pulses can be reduced to further aggravate the receivers' synchronizing system. The sync level of pulse 23 illustrated in FIG. 3 is reduced. The normal sync level is represented by dotted lines 24. The ratio of sync level to total video level in a standard signal is large enough to insure that scan synchronization is maintained even when the received signal is otherwise too weak to produce an acceptable picture. This ratio can be reduced considerably, down to about 60% before scan synchronization becomes unreliable, provided the video level is normal.

Figure 4:
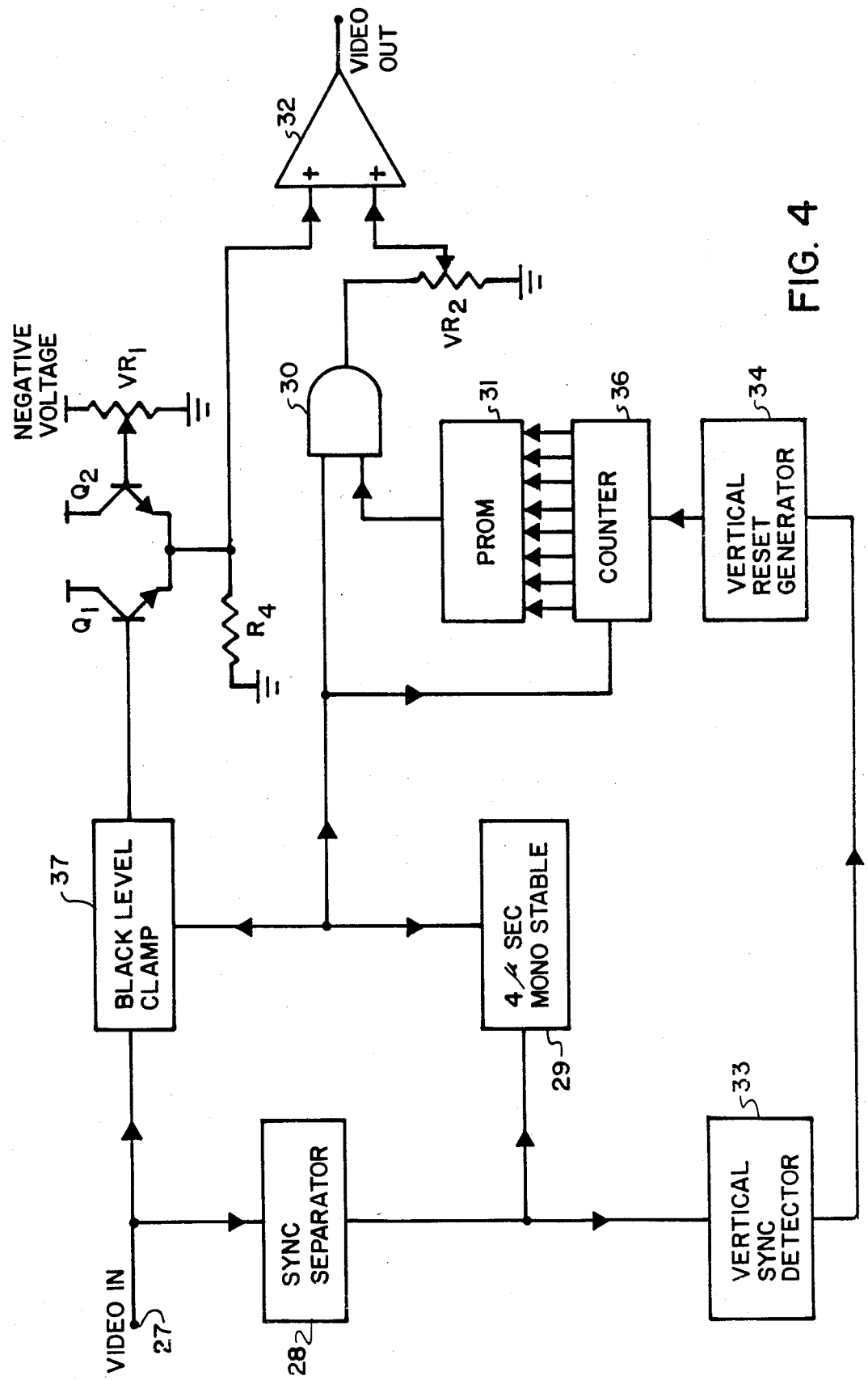
FIG. 4 is a block diagram of typical circuitry for modifying a video signal waveform to produce the waveform of FIG. 3.

Turning now to FIG. 4, there is shown a block diagram of typical apparatus which can be utilized to practice the method of the present invention as described above in connection with FIG. 3. It should be understood that many different kinds of circuit arrangements are possible to produce the modified signal, and the embodiment described in connection with the block diagram of FIG. 4 is exemplary only.

Referring to FIG. 4, incoming video signals at a terminal 27 are applied to a synchronizing pulse separator 28, which generates composite sync pulses at its output. The trailing edges of these pulses trigger a monostable multivibrator 29, which generates approximately four microsecond-long, positive-going pulses during the back porch interval. These pulses are applied to an AND gate 30 along with a gating pulse from a programmable read-only memory (PROM) 31. This gating pulse is high for a predetermined time encompassing the vertical blanking interval of a field, and consequently AND gate 30 generates a back porch pulse only on those lines of the picture. The pulse output of the AND gate 30 is applied to a potentimeter $VR_2$, which has its output connected to one input of a summing amplifier 32. Thus, the potentiometer $VR_2$ controls the level of the back porch pulse added to the video signal.

The sync pulses from the sync separator 28 are also applied to a vertical sync detector 33 which generates a field rate pulse which occurs just after the first broad pulse of the vertical interval. This pulse is shaped by the vertical reset generator 34 and is used to reset the output data lines of counter 36. The counter 36, which is a 9 bit counter, counts the pulses from the four microsecond monstable 29. The 9 data lines of counter 36 are connected to the address inputs of PROM 31. Each line of the field is assigned a unique address in the PROM which can be programmed to generate a high at its output for any or all lines. The PROM 31 is programmed so that a positive pulse is applied to its output for only those lines on which back porch pulses are wanted.

The incoming video signal at terminal 27 is applied to a black level clamp 37 which is driven by pulses from the four microsecond monostable 29. The video at the output of the black level clamp 37 will be at zero volts (for example) during the back porch interval. Transistors $Q_1$ and $Q_2$ and resistor $R_4$ comprise a well-known negative-peak clipping circuit with the clipping level determined by the voltage on the base of transistor $Q_2$. The base of $Q_2$ is connected to the slider of a potentiometer $VR_1$, the top of which is connected to a negative voltage equal to the sync level on the base of transistor $Q_1$. The potentiometer $VR_1$, therefore, controls the amount of sync level reduction in accordance with that aspect of the present invention.

What has been described is a method along with exemplary apparatus for modifying a video signal so that a television receiver produces a normal picture from the modified signal, whereas a videotape recording of this signal produces generally unacceptable pictures. Many different forms of apparatus and circuits are possible for practicing the method of this invention, and the particular circuitry illustrated in FIG. 4 is by way of example only. Various modifications are possible without departing from the true spirit and scope of the present invention. For example the duration of the added pulse may be set within a wide range of durations (0.5 to 5 microseconds). The amplitude of this pulse also may be varied and it may be of a shape other than rectangular, such as sine squared.

What is claimed is:

1. A method for processing a video signal so as to inhibit the making of acceptable videotape recordings therefrom while the same is capable of producing a substantially normal picture on a television monitor/-receiver, wherein the video signal has sync pulses followed by back porch intervals, comprising the step of significantly raising the voltage amplitudes of a portion of the back porch intervals following the trailing edges of a substantial number of sync pulses in a cluster thereof.

2. The method of claim 1 wherein said cluster of sync signals is a group thereof which occurs within no more than generally 20% of the video signal responsible for a field.

3. The method of claim 2 wherein said cluster of sync signals is a group thereof which occurs within about 11% of the video signal responsible for a field.

4. The method of claim 1 or claim 2 wherein said cluster of sync pulses includes those within the vertical blanking interval of a field.

5. The method of claim 4 wherein said cluster of sync pulses also includes those on at least some of the scan lines adjacent said vertical blanking interval that form picture elements that are not displayed.

6. The method of claim 1 or claim 2 wherein said voltage amplitudes of said portion of said back porch intervals is raised to at least the peak white voltage level of said video signal.

7. The method of claim 1 wherein said voltage amplitudes at said back porch intervals is raised by adding positive pulse to each of said back porch intervals.

8. The method of claim 1 or claim 2 further including the step of reducing the level of each sync pulse.

9. Apparatus for processing a video signal so that the making of acceptable videotape recordings therefrom is inhibited while the same is capable of producing a substantially normal picture on a television monitor/receiver, wherein the video signal has sync pulses followed by back porch intervals, comprising means for adding pulses to the video signal significantly raising the voltage amplitudes of a portion of the back porch intervals following the trailing edge of a substantial number of sync pulses in a cluster thereof.

10. The apparatus of claim 9 wherein means are provided for reducing the level of each sync pulse.

11. The apparatus of claim 9 wherein said cluster of sync pulses is a group thereof which occurs within no more than generally 20% of the video signal responsible for a field of a frame.

12. The apparatus of claims 9, 10 or 11 wherein said cluster of sync pulses includes those within the vertical blanking interval of a field.

13. The apparatus of claim 12 wherein said cluster of sync pulses also includes those on at least some of the scan lines adjacent said vertical blanking interval that form picture elements that are not displayed.

* * * * *